United States Patent [19]

Keske et al.

[11] 4,321,357
[45] Mar. 23, 1982

[54] INJECTION MOLDABLE AMIDE-IMIDE POLYMERS CONTAINING DIVALENT ALIPHATIC RADICALS DERIVED FROM ALIPHATIC DIAMINES

[75] Inventors: Robert G. Keske; James R. Stephens, both of Naperville, Ill.

[73] Assignee: Standard Oil Company (Indiana), Chicago, Ill.

[21] Appl. No.: 112,650

[22] Filed: Jan. 16, 1980

[51] Int. Cl.³ ............................................. C08G 69/26
[52] U.S. Cl. ................................... 528/350; 264/325; 264/331.19; 528/172; 528/188
[58] Field of Search ..................... 528/350, 188, 172; 260/37 N

[56] References Cited

U.S. PATENT DOCUMENTS

| | | | |
|---|---|---|---|
| 2,421,024 | 5/1947 | Summit | 528/350 |
| 3,654,227 | 4/1972 | Dine-Hart | 528/350 |
| 3,661,863 | 5/1972 | Campbell | 528/350 |
| 3,817,942 | 6/1974 | Kovacs et al. | 528/350 |
| 3,841,016 | 10/1974 | Dickson | 43/100 |
| 3,842,026 | 10/1974 | Dixon et al. | 528/353 X |
| 3,862,092 | 1/1975 | Flowers et al. | 528/350 |
| 4,066,631 | 1/1977 | Dimmig | 528/350 |

FOREIGN PATENT DOCUMENTS 570858 7/1945 United Kingdom ............... 528/350

*Primary Examiner*—Howard E. Schain
*Attorney, Agent, or Firm*—Gunar J. Blumberg; William T. McClain; William H. Magidson

[57] ABSTRACT

A novel process for the preparation of injection moldable polymers prepared from diacylated aliphatic diamines, tricarboxylic anhydride compounds and aliphatic primary diamines. These polymers are useful for the preparation of injection molded articles and fibers. A process for enhancing the crystallization of these polymers by the addition of nucleating agents is also disclosed.

11 Claims, No Drawings

INJECTION MOLDABLE AMIDE-IMIDE POLYMERS CONTAINING DIVALENT ALIPHATIC RADICALS DERIVED FROM ALIPHATIC DIAMINES

BACKGROUND OF THE INVENTION

1. Field of the Invention

The field of the invention relates to polyamideimide polymers prepared from N,N-diacylated aliphatic, cycloaliphatic or araliphatic diamines, tricarboxylic acid anhydride compounds and aliphatic, cycloaliphatic or araliphatic diamines and to molded objects and fibers prepared from these polymers.

2. Background

Injection moldable amide-imide polymers have been prepared utilizing aromatic diamines. This is disclosed in U.S. Pat. Nos. 4,016,140 (1977) and 3,573,260 (1971). The prior art does not disclose that injection molded, melt prepared, crystalline objects can be prepared from aliphatic diamine moieties. Except for the aforecited patents, the prior art discloses that the major application of amide-imide polymers has been as wire enamels. This is illustrated in U.S. Pat. Nos. 3,817,942 (1974), 3,661,832 (1972), 3,454,890 (1970) and 3,347,878 (1967).

The general object of this invention is to provide melt prepared, ordered, linear, crystalline injection moldable polymers containing aliphatic, cycloaliphatic and araliphatic moieties. A more specific object of this invention is to provide polyamide-imide polymers containing aliphatic amine moieties which polymers are suitable for use as an engineering plastic particularly for use in injection molding and the manufacture of fibers. Another object is to provide suitable nucleating agents for the polyamide-imide polymers to enhance the crystallization rate of the ordered polyamide-imide polymers.

We have now found that injection moldable polyamide-imide polymers can be produced by reacting diacylated aliphatic, cycloaliphatic and araliphatic diamines with tricarboxylic acid anhydride compounds and aliphatic diamines, cycloaliphatic and araliphatic diamines in a molar ratio of about 1:1.95:0.9 to 0.9:1.95:1, advantageously in a molar ratio of about 0.97:2:1.03 to about 1.03:2:0.97 at a temperature of about 400° to 700° F. to obtain an injection moldable amide-imide polymer. The order for the addition of the reactants is not critical and all reactants can be added simultaneously or in any order desired. It has been discovered that the acylated diamine reacts preferentially with the acid groups of the tricarboxylic acid anhydride compound and that all the reactants, acylated aliphatic diamine, tricarboxylic anhydride compound and aliphatic diamine can be combined in the presence of the organic polar solvent such as dimethyl acetamide. Furthermore, acylated diamine need not be isolated or purified prior to its combination with the tricarboxylic acid anhydride compound and the aliphatic diamine.

The injection moldable linear polyamide-imide polymer of this invention comprises the following repeating structural unit

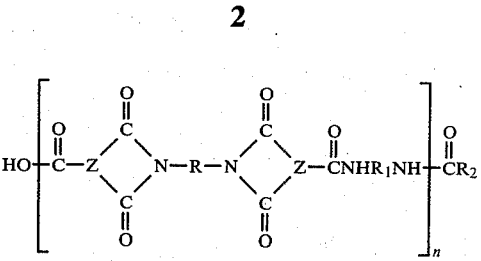

In the foregoing structural unit Z is a trivalent aromatic radical. Z may be a trivalent radical of benzene, naphthalene, biphenyl, diphenyl ether, diphenyl sulfide, diphenyl sulfone, ditolyl ether, and the like.

Useful aromatic tricarboxylic acid anhydrides which contribute the trivalent radical moiety of Z include those compounds containing at least one pair of carboxyl groups in the ortho position with respect to each other or otherwise situated in a fashion which permits the formation of an anhydride structure, one other carboxyl group and from 9 to 21 carbon atoms. Within these limits, these compounds may contain one or more benzenoid rings such as, for instance, trimellitic anhydride and its isomers and multi-ring compounds such as the 1,8-anhydride of 1,3,8-tricarboxylnaphthalene. Usually these compounds contain up to three benzenoid rings.

The aromatic tricarboxylic acid anhydride used in the novel process to form the polyamide-imide polymers of this invention is of the formula:

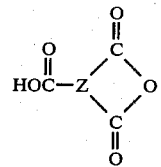

where Z is a trivalent aromatic radical defined as set forth hereinabove. The following aromatic tricarboxylic anhydrides are preferred: trimellitic acid anhydride; 2,3,6-naphthalene tricarboxylic anhydride; 1,5,6-naphthalene tricarboxylic anhydride, and the like; 2,6-dichloronaphthalene-4,5,7-tricarboxylic anhydride, and the like. One of the preferred aromatic tricarboxylic anhydrides is trimellitic anhydride since this compound is readily available and forms polymers having excellent physical properties of tensile strength and elongation and is resistant to high temperatures.

R and $R_1$ may be the same or be different and are divalent araliphatic, aliphatic, or cycloaliphatic radicals of from 2 to 18 carbon atoms in which carbon atoms attached to N are aliphatic carbon atoms and $R_2$ is an aliphatic radical of from 1 to 3 carbon atoms.

R and $R_1$ are derived from aliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylenediamine, 4,4'-diaminodicyclohexylmethane, xylylene diamine.

Low molecular weight polyamide-imides from aliphatic diamines have been prepared by a variety of methods by the prior art. However, none of these methods have produced polymers which are useful for injection molding applications. Applicants have discovered a process for the preparation of ordered linear crystalline injection moldable polytrimellitic amideimide polymers, which process comprises reacting fully acylated aliphatic, cycloaliphatic or araliphatic diamines with tricarboxylic acid anhydride compounds and aliphatic, cycloaliphatic or araliphatic diamines in a molar ratio of about 1:2:1 at a temperature of about 400° to 700° F., preferably 450° to 650° F. Optionally the polymer may be further polymerized under solid state polymerization conditions at a temperature of about 400° to 550° F. The resulting high molecular weight injection moldable polymer obtained has an inherent viscosity in the range of 0.4 to 3.0. For the purpose of this invention inherent viscosity is measured at 25° C. and 0.5% w/v in 60/40 w/w phenol/1,1,2,2, tetrachloroethane. The term "solid state polymerization" refers to chain extension of polymer particles under conditions where the polymer particles retain their solid form and do not become a fluid mass. These polymers have excellent mechanical and thermal properties and can be readily injection molded. This injection moldability of these polymers can be partially attributed to the fact that these polymers are linear and are not cross linked. Injection molding of the polymers is accomplished by injecting the polymer into the mold maintained at a temperature of about 100°–500° F. In this process a 0.2–2.0 minutes cycle is used with a barrel temperature of about 400° F. to 700° F. The injection molding conditions are given in Table I.

TABLE I

| Mold Temperature | 100–500° F. |
|---|---|
| Injection Pressure | 2,000–20,000 psi and held for 0.2–15.0 seconds |
| Back Pressure | 0–400 psi |
| Cycle Time | 5–120 seconds |
| Extruder: | |
| Nozzle Temperature | 400° F. to 700° F. |
| Barrels: | |
| Front heated to | 400° F. to 700° F. |
| Screw: | |
| 10–200 revolutions/minute | |

The mechanical properties of the polymers prepared in the Examples are given in Tables 2, 3, 4 and 5.

The solid state polymerization is carried out below the melting point of the polymer and can be conducted in several ways. However, all the techniques require heating the ground or pelletized polymer below the polymer melting point, generally of about 400° to 550° F. while either sparging with an inert gas, such as nitrogen or air, or operating under vacuum. In applicant's process the acylated diamine need not be isolated or purified prior to its further reaction with the tricarboxylic acid anhydride compound and the aliphatic diamine. Therefore, one can react two moles of acetic anhydride or propionic anhydride and one mole of the aliphatic diamine and use the resulting diacylated diamine solution in acetic acid or propionic acid to react the two moles of tricarboxylic anhydride compound and one mole of diamine and heat the mixture to complete imidization without purification or isolation. Usually, high molecular weight crystalline polyamide-imide polymers result.

It should be noted that prior to full imidization in our process there is an intermediate polyamic acid formed of the following structure:

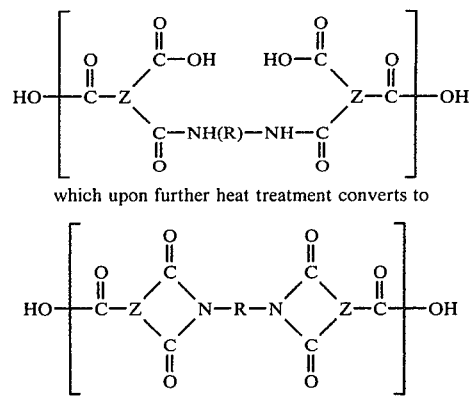

which upon further heat treatment converts to and then to the injection moldable final polyamide-imide polymer disclosed hereinbefore. The values for Z and R are the same as used throughout this specification.

It has been found that to facilitate the injection moldability of the polymer produced according to applicants' novel process, nucleating agents may be employed. Without using a nucleating agent, crystalline samples can be obtained by injection molding if the mold temperature is maintained at a level of about 350° to 400° F. and the mold remains closed during the long crystallization part of the cycle. However, the rate of crystallization of the polymer may be so slow that the cycle time on occasion could be uneconomical. To obviate this problem, applicants have discovered effective nucleating agents. The more effective of these agents has been talc when used in about 0.01 to 10.0 weight % of the total polymer, preferably about 0.05 to 4.0 weight %. For example, it has been found that fumed silicas and zinc oxide show no effect and are useless as nucleating agents. When talc was utilized, the crystallization temperature of the polymer increased from 199° C. to 223° C. The use of talc as a nucleating agent lowers the induction period for the onset of crystallization of about 10 fold and also lowers the half-life from about 90 seconds to 30 seconds at 200° C.

The following examples illustrate the preferred embodiments of this invention. It will be understood that these examples are for illustrative purposes only and do not purport to be wholly definitive with respect to the conditions or scope of the invention.

EXAMPLE NO. 1

Preparation of N,N'-diacetyl-1,6-hexanediamine

Acetic anhydride (1,000 g) was placed in a 3 liter round bottom flask, immersed in a water bath, and equipped with magnetic stirrer and addition funnel. 1,6 hexanediamine HMDA (485 g) in 500 ml of chloroform was added dropwise to the stirred acetic anhydride over 55 min. After the addition was complete, the mixture was poured into 3 l of ethyl acetate and allowed to crystallize overnight. The product N,N'-diacetyl-1,6-hexanediamine was filtered off and washed with 1.5 l of ethylacetate. After drying (20 in Hg vacuum, 50° C.), 704 g of product (84%) was obtained, m. pt. 128°–129.5° C.

EXAMPLE NO. 2

Polymer Preparation

Trimellitic anhydride (384.2 g), dimethylacetamide (DMAC) (500 ml), trisnonylphenylphosphite (1 g), and N,N'-diacetyl-1,6-hexanediamine (200 g) were placed in a 2 liter 3-necked flask equipped with addition funnel and nitrogen inlet, metal stirrer, and distillation take off. The mixture was warmed with stirring, and the system flushed with nitrogen. A solution of 116 g 1,6-hexanediamine in 150 ml DMAC was added over 5 min. The bottom half of the spherical heating mantle surrounding the flask was heated to 600° F. After 30 min., about 500 ml of distillate was collected, and the top half of the mantle was now heated with a Variac set at 50. After 30 min. more, an additional 225 ml of distillate had been collected and a low vacuum (20 in Hg) was drawn on the system. After another 20 min., a high vacuum (1 mm Hg) was drawn. Stirring 30 min. under high vacuum produced a viscous polymer melt. The polymer was cooled (it crystallized on cooling) and ground. The inherent viscosity of the polymer was 0.81 at a concentration of 0.5% w/v in 60:40 w/w phenol:tetrachloroethane @ 25° C.

EXAMPLE NO. 3

Polymer Preparation

Acetic anhydride (306 g, 3 mole) was placed in a 3 liter 3-necked flask equipped with metal stirrer, addition funnel, nitrogen inlet, and reflux condensor. A solution of 174 g (1.5 mole) of 1,6-hexanediamine (HMDA) in 300 ml of dimethylacetamide (DMAC) was added over 10 min. Trimellitic anhydride (576.3 g) and trisnonylphenylphosphite (1.5 g) were added over 10 minutes. This was followed by the addition of a solution of 174 g of HMDA in 250 ml of DMAC. The mantle temperature was set at 570° F., and a slow distillation of solvent (860 ml) over 3 hours ensued. The polymer melt was stirred 35 min. under low vacuum followed by 40 min. under high (1 mm Hg) vacuum. It was then cooled and ground, during which time it crystallized. The inherent viscosity was 0.70 in 60:40 w/w phenol:tetrachloroethane @ 25° C. and at a concentration of 0.5% w/v.

EXAMPLE NO. 4

Polymer Preparation

Trisnonylphenylphosphite (1 g) and 1,6-hexanediamine (HMDA) (174 g, 1.5 mole) were placed into a 3 1-3 necked flask equipped with metal stirrer, addition funnel with nitrogen inlet, and reflux condensor. The system was flushed with nitrogen and then 160 g (1.57 mole) acetic anhydride was added over 10 min. The nitrogen was turned on, the reflux condenser replaced with a distillation take off, and the bottom mantle temperature set at 600° F. After heating one hour under slow nitrogen flow, 30 ml of distillate was collected, and the flask contents were at 540° F. This was cooled to 250° F. and 500 ml dimethylacetamide (DMAC) and 576 g trimellitic anhydride added. To this stirred mixture was slowly added 174 g HMDA in 250 ml DMAC. Heating again was started (600° F.), and after 70 min., 790 ml of distillate was collected. A low vacuum (20 in Hg) was drawn on the system, and another 170 ml was collected over 40 min. Stirring under high vacuum 30 minutes yielded crystalline polymer after cooling and grinding with an inherent viscosity of 0.64 (0.5% w/v) in 60:40 w/w phenol:tetrachloroethane.

EXAMPLE NO. 5

Solid State Polymerization

A sample of polymer prepared according to the procedure described in Example 3 was heated to 250° C. under high vacuum for 16 hr. The inherent viscosity of the polymer increased from 0.89 to 1.30 (0.5% w/v) in 60:40 w/w phenol:tetrachloroethane.

EXAMPLE NO. 6

The polymer from Example 2 (487 g) was blended with fiberglass (PPG 3531, 209 g) and Irganox 1098 (3.5 g). This blend was injection molded on an Arburg injection molding machine using a melt temperature of 550° F. Samples of the molded polymer (which was amorphous) were crystallized at 370° F. Results of the mechanical property tests and thermal aging tests are shown in Tables 2 and 3.

TABLE 2

Mechanical Properties of 30% Fiberglass Filled Ordered Poly(hexamethylenetrimellitamide-imide)

|  | ASTM Method | Amorphous | Crystalline |
|---|---|---|---|
| Tensile Strength, psi | D-638 | 25,300 | 25,500 |
| Tensile modulus, psi | D-638 | 790,000 | 875,000 |
| Elongation at break, % | D-638 | 5.5 | 4.4 |
| Flexural strength, psi | D-790 | 34,000 | 34,800 |
| Flexural modulus, psi | D-790 | 1,086,000 | 1,230,000 |
| Tensile impact strength ft. lb./in.$^2$ | D-1822 | 69.5 | 40.7 |
| H.D.T. @ 264 psi °F. | D-648 | (230) | 447 |

TABLE 3

Thermal Aging @ 400° F. of Crystalline, 30% Glass Filled Poly(hexamethylenetrimellitamide-imide) (A)

|  | ASTM Method | Control | 100 hr. | 500 hr. | 1,000 hr. |
|---|---|---|---|---|---|
| Ultimate Tensile Strength, psi | D-638 |  |  |  |  |
| A |  | 25,500 | 19,000 | 17,600 | 15,600 |
| Nylon 66 (33% glass) |  | 25,000 | 28,000 | 21,400 | 12,900 |
| % Elongation |  |  |  |  |  |
| A |  | 4.4 | 2.8 | 2.8 | 2.1 |
| Nylon 66 |  | 5.3 | 4.4 | 2.6 | 1.6 |
| Tensile Impact, ft. lb./in.$^2$ | D-1822 |  |  |  |  |
| A |  | 40.7 | 20.1 | 21.5 | 13.5 |
| Nylon 66 |  | 67 | 27 | 13 | 7 |

EXAMPLE NO. 7

Use of Nucleating Agent

One hundred gram samples of the polymer prepared according to the process of Example No. 3 ($n_{inh}$=0.70 dl/g) were mixed (0.4%) with various possible nucleating agents. These samples were then extruded through a Brabender extruder where all zones were set at 260° C. The extruded polymer samples were ground and submitted for differential scanning calorimetry runs. They showed that the crystallization temperature (Tc) after first melting for the sample containing 0.4 weight percent talc was 223° C. while for the control it was 199° C. A sample of polymer containing 0.4% talc which showed rapid crystallization was submitted for the determination of the isothermal crystallization kinetics via the depolarized light intensity method. The nucleation by talc lowers the induction period for the onset of crystallization for this sample from 27 sec. for the virgin polymer to 3 sec. It also lowers the half life of crystallization from 90 sec. to 30 sec. @ 200° C.

EXAMPLE NO. 8

Use of Nucleating Agent

Seven hundred grams of polymer prepared according to the process of Example No. 3. ($n_{inh}=0.67$) was mixed with 300 g of fiberglass (PPG 3531) and 4 g of talc (Steawhite 200) by mixing the ingredients in a jar. A second sample containing the same amount of polymer and fiberglass, and 40 g of talc (Steawhite 200) was also prepared. The samples were injection molded on a Arburg machine using cycle times of 35 and 33 sec., and mold temperatures of 350° and 365° F. respectively. Properties of the resulting specimens, which were crystalline, are listed in the following table.

TABLE 4
Physical Properties of Fiberglass Filled Injection Molded Amide-Imide Polymer

|  | ASTM Method |  |  |
|---|---|---|---|
| Mold Temp., °F. |  | 350 | 365 |
| Talc |  | 0.4 | 4% |
| Tensile Strength, psi | D-638 | 21,500 | 22,800 |
| Tensile Modulus, psi | D-638 | 835,000 | 980,000 |
| % Elongation | D-638 | 3.2 | 3.4 |
| Flexural Strength, psi | D-790 | 32,500 | 34,100 |
| Flexural Modulus, psi | D-790 | 1,430,000 | 1,460,000 |
| Tensile Impact, ft. lb./in.$^2$ | D-1822 | 37.8 | 24.8 |
| Izod ft. lb./in. notch | D-256 | N.A. | 1.26 |
| H.D.T. @ 264 psi, °F. | D-648 | 460 | 485 |

EXAMPLE NO. 9

FIBER PREPARATION

Multifilament yarns were prepared from polymer prepared according to Example 3 using a spinneret having 7 orifices, each 12 mil in diameter and 24 mil in length (2:1 L/D ratio). The resin was spun at 0.5 cc/min and the yarn was taken up at 60 ft/min. Spinning was successful both at 300° C. and at 305° C. Samples of the yarns extruded at 300° C. and 305° C. were oriented on a draw winder. The principal parts of the draw winder are a driven feed roll, a heated platen over which the fiber is passed onto a faster driven take up roll, and a constant tension winder. We were able to orient both yarns at 160° C. at draw ratios of 4.0× and 4.5×. The denier, tenacity, initial modulus, elongation at break, knot strength, loop strength, and tensile factor were determined by individual filament breaks, for each of the oriented yarns, after they had been conditioned 24 hr at 73° F. and 65% RH. The results are given in Table V.

TABLE 5
Tensile Properties[1] of Oriented Yarns

| Sample | A | B | C | D |
|---|---|---|---|---|
| Spinning temperature, °C. | 300 | 300 | 305 | 305 |
| Draw Ratio[2] | 4.0 | 4.5 | 4.0 | 4.5 |
| Individual fiber denier | 8.0 | 8.4 | 8.1 | 9.4 |
| Tenacity, g/d | 5.3 | 4.9 | 3.9 | 4.2 |
| Initial modulus, g/d | 94 | 91 | 66 | 74 |
| Elongation at break, % | 15 | 9 | 20 | 13 |
| Knot strength, g/d | 3.3 | 4.1 | 3.8 | 2.9 |
| Loop strength, g/d | 2.4 | 2.3 | 2.8 | 1.7 |

[1]Average of 5 specimens
[2]All samples oriented at 160° C.

We claim:

1. A process for the preparation of ordered linear crystalline injection moldable polyamide-imide polymers which process comprises reacting fully acylated aliphatic, cycloaliphatic or araliphatic diamines with tricarboxylic acid anhydrides compounds and aliphatic, cycloaliphatic or araliphatic diamines in a molar ratio of about 1:2:1 at a temperature of about 400 to 700 Fahrenheit.

2. The process of claim 1 wherein the tricarboxylic acid anhydride compound is trimellitic anhydride and wherein the acylated diamine is an aliphatic, cycloaliphatic or araliphatic diamine containing from 2 to 18 carbon atoms.

3. The process of claim 2 wherein the acylated diamine is N,N'diacetyl-1,6 hexane diamine.

4. The process of claim 2 wherein the aliphatic, cycloaliphatic or araliphatic diamine contains from 2 to 18 carbon atoms.

5. The process of claim 4 wherein the aliphatic diamine is 1,6 hexane diamine.

6. The polymer produced according to claim 1 wherein the polymer is in the form of a molded object.

7. The polymer produced according to claim 1 wherein the polymer is in the form of a fiber.

8. The polymer produced according to claim 5 wherein the polymer is in the form of a molded object.

9. The polymer produced according to claim 5 wherein the polymer is in the form of a fiber.

10. The process of claim 1 wherein talc is added as the nucleating agent in about 0.01 to 10.0 weight percent of the total polymer.

11. The process of claim 4 wherein talc is added in about 0.01 to 10.0 weight percent of the total polymer.

* * * * *